United States Patent [19]
Hamaguchi
[11] Patent Number: 4,534,233
[45] Date of Patent: Aug. 13, 1985

[54] WIRE-DRIVING DEVICE FOR WINDOW REGULATOR

[75] Inventor: Osamu Hamaguchi, Nishinomiya, Japan
[73] Assignee: Nippon Cable System Inc., Takarazuka, Japan

[21] Appl. No.: 550,149
[22] Filed: Nov. 9, 1983
[30] Foreign Application Priority Data
Apr. 18, 1983 [JP] Japan .................................. 58-68117
[51] Int. Cl.³ .............................................. F16H 27/02
[52] U.S. Cl. ....................................... 74/89.2; 49/352; 74/89.15; 74/89.14
[58] Field of Search ...................... 74/89.14, 89.2, 425, 74/89.22, 411; 49/352

[56] References Cited
U.S. PATENT DOCUMENTS

| | | | |
|---|---|---|---|
| 2,370,029 | 2/1945 | Gillespie | 74/89.2 |
| 3,493,233 | 2/1970 | Foufounis | 74/89.15 |
| 3,623,323 | 11/1971 | Fritz et al. | 74/89.14 |
| 3,973,445 | 8/1976 | Ballard | 74/89.22 |
| 4,440,354 | 4/1984 | Kobayashi et al. | 49/352 |
| 4,449,416 | 5/1984 | Huitema | 74/89.14 |
| 4,486,051 | 12/1984 | Becker | 74/425 |

*Primary Examiner*—Henry C. Yuen
*Attorney, Agent, or Firm*—Armstrong, Nikaido, Marmelstein & Kubovcik

[57] ABSTRACT

A wire-driving device for a window regulator comprising a worm wheel rotatably contained in a housing, first and second pulleys arranged at both sides of the worm wheel respectively, means for transmitting torque from worm wheel to the pulleys and a worm meshing with the worm wheel and being driven by a motor, whereby first and second wires wound round the pulleys respectively are driven. The motor driven wire-driving device is thinner than conventional devices.

4 Claims, 6 Drawing Figures

WIRE-DRIVING DEVICE FOR WINDOW REGULATOR

BACKGROUND OF THE INVENTION

The present invention relates to a wire-driving device for a window regulator (hereinafter referred to as "driving device"), and more particularly to a driving device which has a reduced whole thickness.

Until now, a window regulator, e.g. a window regulator shown in FIG. 6, is employed as a means for automatically opening and closing a window of an automobile, a building, or the like. The window regulator shown in FIG. 6 comprises a driving device 80 and a driven device 82. The driving device 80 changes a rotational motion of a motor 10 into a linear motion of two wires 41, 42 ends of which are engaged to a circumference of a pulley 6 and which are wound in the opposite directions with each other. The change of the motion is obtained by transmitting the above rotational motion to a pulley 6, winding one of the wires 41, 42 round the pulley 6 and unwinding the other wire from the pulley 6. As shown in FIG. 6 the driven device 82 guides a window glass 81 to which the other ends of the above wires 41, 42 are fixed so that the wire 41 extends in the closing direction of an arrow C and the wire 42 extends in the opening direction of an arrow D respectively. The driving device 80 possesses a housing 1. A worm wheel 5 is rotatably contained in the housing 1. A worm 11 is arranged to be meshed with the worm wheel 5 and is driven by the motor 10. The motor 10 is arranged so that an axis of the motor 10 locates on a center plane 9 of the worm wheel 5; the center plane 9 being perpendicular to a rotaional axis of the worm wheel 5. The pulley 6 is arranged concentrically at a side surface of the worm wheel 5 through a means for transmitting torque. In the conventional device shown in FIG. 6, the worm wheel 5 and the pulley 6 are directly connected, whereby the torque is transmitted from the worm wheel 5 to the pulley 6 through a connecting member.

Total thickness of such a conventional driving device depends on not only a thickness To which is a total of thicknesses of the pulley 6, the worm wheel 5, and the like, but also at least a half of the thickness t of the motor 10, since the worm wheel 5 is fixed or connected through the means for transmitting torque to one side surface of the pulley. Therefore, the conventional driving device has a disadvantage that the whole thickness of the driving device becomes very thick and bulky. Also, in the driving device, there is another disadvantage that the fixing of the device to a door panel, or the like is complicated, since the motor 10 projects from the side surface of the device.

Further, when a shock absorber (not shown in FIG. 6) is provided with the means for transmitting torque in order to change smoothly the rotational motion of the motor 10 into the linear motion of the wires 41, 42, for protecting a window glass 81 and the motor 10, or when the pulley 6 comprises two parts around which each wire 41, 42 is wound respectively, and a one-way-clutch means such as a set of ratchet teeth is provided between the two parts (shown in FIG. 6 by two-dot-chain lines), there occures a problem that the thickness of the driving device increases.

OBJECT OF THE INVENTION

The main object of the invention is to provide a wire-driving device for a window regulator which is driven by a motor and in which whole thickness is comparatively thin.

Another object is to provide a thin and motordriven wire-driving device for a window regulator though the device includes a shock absorber and/or a one-way-clutch means.

SUMMARY OF THE INVENTION

In accordance with the present invention, there can be provided a wire-driving device which has characteristics that a pulley is divided into a first pulley around which a first wire is wound and a second pulley around which a second wire is wound, the first pulley and the second pulley are arranged at both sides of a worm wheel respectively, and the first pulley and the second pulley are connected to the worm wheel through a means for transmitting torque.

Therefore, since the thickness of the motor is not added to the thickness of the pulleys, and the like, a driving device of the present invention has a very thin body.

These and other objects and advantages will be apparent from the following description with reference to the accompaning drawings.

DETAILED DESCRIPTION OF THE INVENTION

Figure 1:
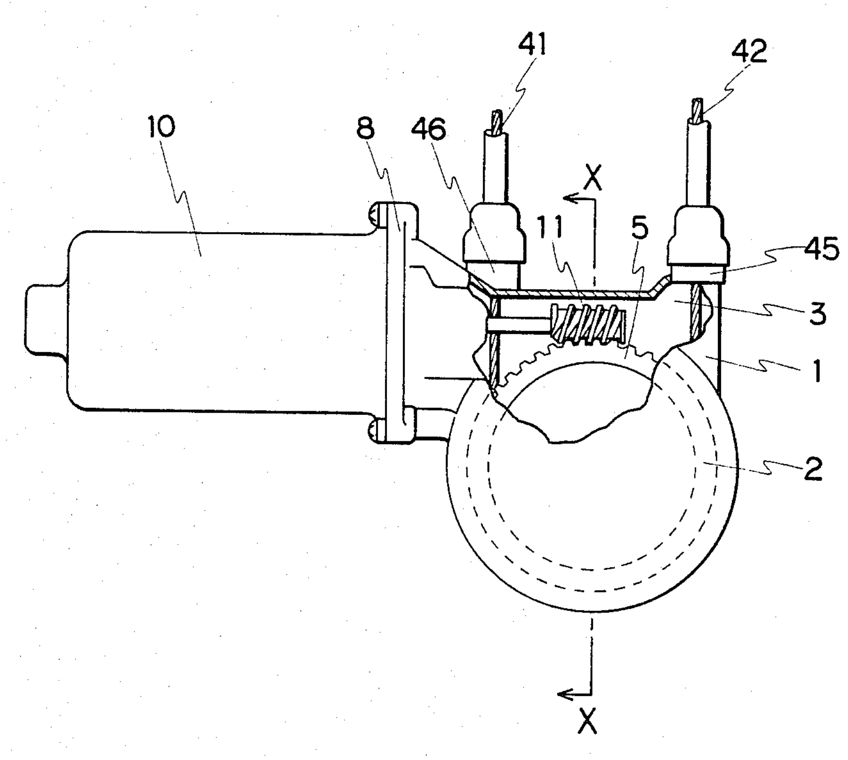
FIG. 1 is a partially cutaway front view showing an embodiment of the driving device of the invention.
Figure 2:
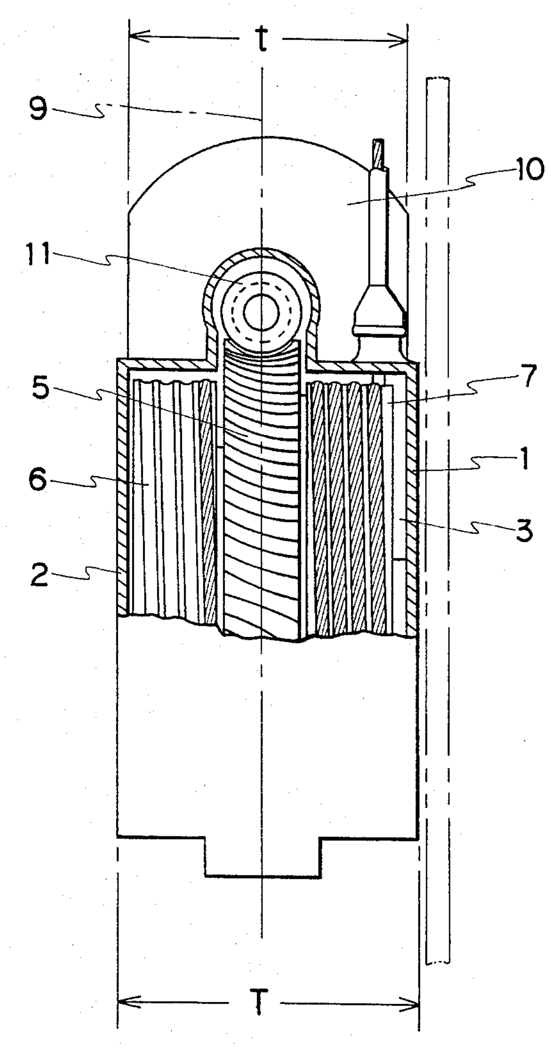
FIG. 2 is a partially cutaway side view of the embodiment of the driving device of the invention shown in FIG. 1.

As shown in FIGS. 1 and 2, in a driving device of the invention, a worm wheel 5 is rotatably contained in a cavity 3 formed by a cup-formed housing 1 and a lid 2 closing an opening of the housing 1. A first pulley 6 and a second pulley 7 to which a torque is transmitted from the worm wheel 5 through a means for transmitting torque mentioned latter, are rotatably and concentrically arranged respectively at both sides of the worm wheel 5. A motor 10 is securely mounted on a flange portion 8 formed with a side wall portion of the housing 1. An axis of the motor 10 locates on a center plane 9 of the worm wheel; the center plane being perpendicular to the rotational axis of the worm wheel 5. A worm 11 fixed on the end portion of the rotational axis of the motor 10 and the above worm wheel 5 are meshed together.

Since a driving device of the invention is constructed as is described above, a whole thickness (T in FIG. 2) of the driving device depends on only the total of the thicknesses of the first pulley 6, the second pulley 7, the worm wheel 5, the housing 1 and the lid 2. That is to say, a thickness t of the motor 10 is not added to the whole thickness T of the device. Therefore, the driving device itself can be constructed very thinly. In case that the thickness t of the motor 10 is larger than the above thickness T, the thickness of the driving device is the thickness t of the motor 10.

Figure 3:
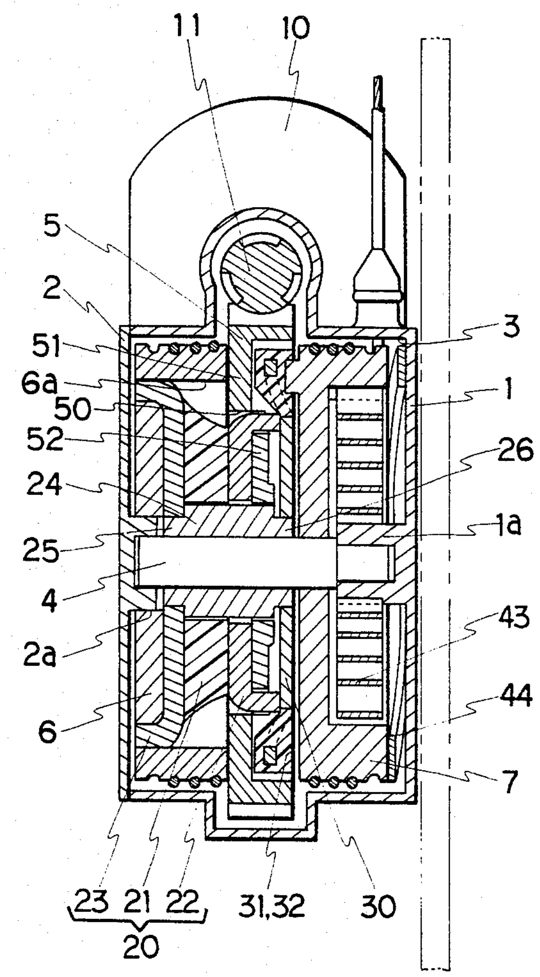
FIG. 3 is an enlarged sectional view on line X—X of FIG. 1.
Figure 4:
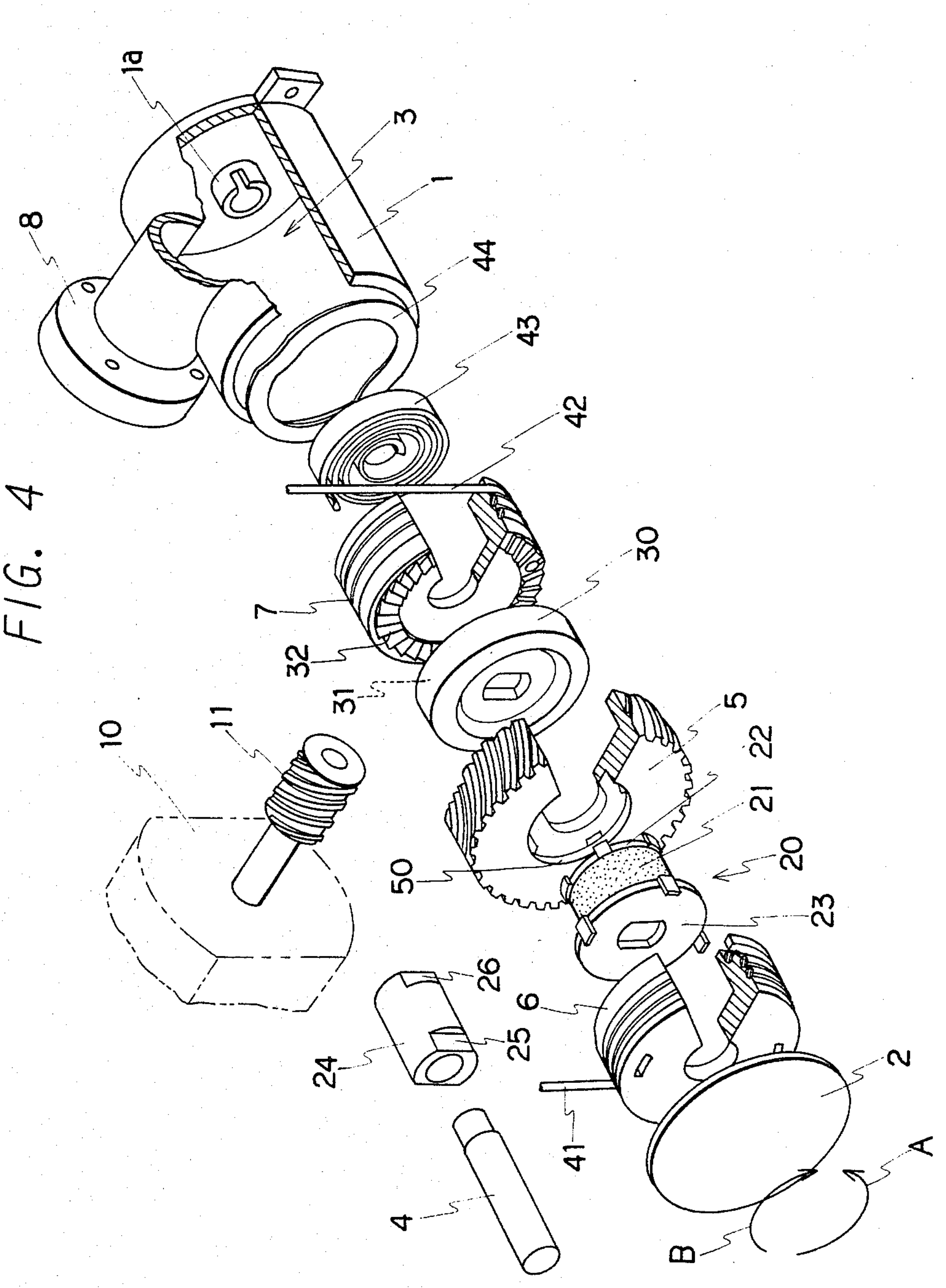
FIG. 4 is an exploded view in perspective of the embodiment of the driving device of the invention shown in FIG. 1.

In an embodiment of a driving device of the invention shown in FIGS. 3 and 4, a means for transmitting torque from a worm wheel 5 to the first pulley 6 and the second pulley 7 comprises a cylindrical shock absorber 20 and a shaft 24 inserted through the shock absorber 20 and the worm wheel 5. An end portion 22 of the shock absorber 20 is connected to one side surface of the worm wheel 5. An end portion 25 of the shaft 24 is fixed at the inner surface of a hall 23*a* of the other end 23 of the shock absorber 20.

The other end portion of the shock absorber 20 is connected to the first pulley 6. The other end portion of the shaft 24 is connected to the second pulley. In the above mentioned embodiment, since a torque is respectively transmitted to the first pulley 6 and the second pulley 7 through a common shock absorber 20, the torque is smoothly transmitted without increase of the thickness T of the driving device. That is to say, in the embodiment of the driving device shown in FIG. 3, the torque transmitted from the motor 10 to the worm wheel 5 through the worm 11 is further transmitted successively to a metal plate constituting the end portion 22 of the shock absorber 20, a cylindrical rubber member 21 and another metal plate constituting the other end portion 23 in order. Accordingly, the first pulley 6 is directly driven by the other end portion 23, and the second pulley 7 is driven by the other end portion 23 further through the shaft 24, respectively.

As shown in FIG. 3, when a concave 6*a* is formed in the first pulley 6, the shock absorber 20 is contained in the concave 6*a* and a step 50 is provided between an outer portion 51 and an inner portion 52 of the worm wheel 5, the thickness T of the driving device becomes thinner than a device having no concave 6*a* nor step 50.

Similarly to a conventional device, an automatic tension-adjusting mechanism can be built in a driving device of the present invention. Such a mechanism is constructed, for example, by providing a one-way-clutch which engages only when a pulley is driven in the cable-winding direction (in the direction of an arrow B for the second pulley, as shown in FIG. 4) with a means for transmitting torque from the worm wheel 5 to the first pulley 6 and or a means for transmitting torque from the worm wheel 5 to the second pulley 7. For example, a combination of two sets of ratchet teeth 31, 32 which are respectively formed at adjacent side surfaces of a ratchet plate 30 and the second pulley 7 functions as a one-way-clutch. The ratchet plate 30 is fixed to the other end 26 of the shaft, as shown in FIGS. 3 and 4. Not only ratchet teeth, but also several types of one-way-clutch may be employed as the above one-way-clutch. In case that the above-mentioned automatic tension-adjusting mechanism is built in the driving devices, when elongation of a wire occures or when tension of a wire is adjusted after a driving device is assembled, an elongation or a slack can be easily absorbed. A rotation of the worm wheel 5 in the direction that the wire is wound round the first pulley 6 (in the direction of arrow A in FIG. 4) will cause the ratchet teeth to disengage and allow the first pulley 6 to rotate in the above direction in which the second pulley 7 is retained (in that case, when a wave washer 44 is inserted as a frictional brake means between the second pulley 7 and the housing 1, a taking-up becomes precise), whereby any excess elongation or slack in the wire is taken up. After the tension of the wire is adjusted, the second pulley 7 begins to rotate again by means of frictional force between the ratchet teeth 31, 32 and tensile force of the wire.

Figure 5:
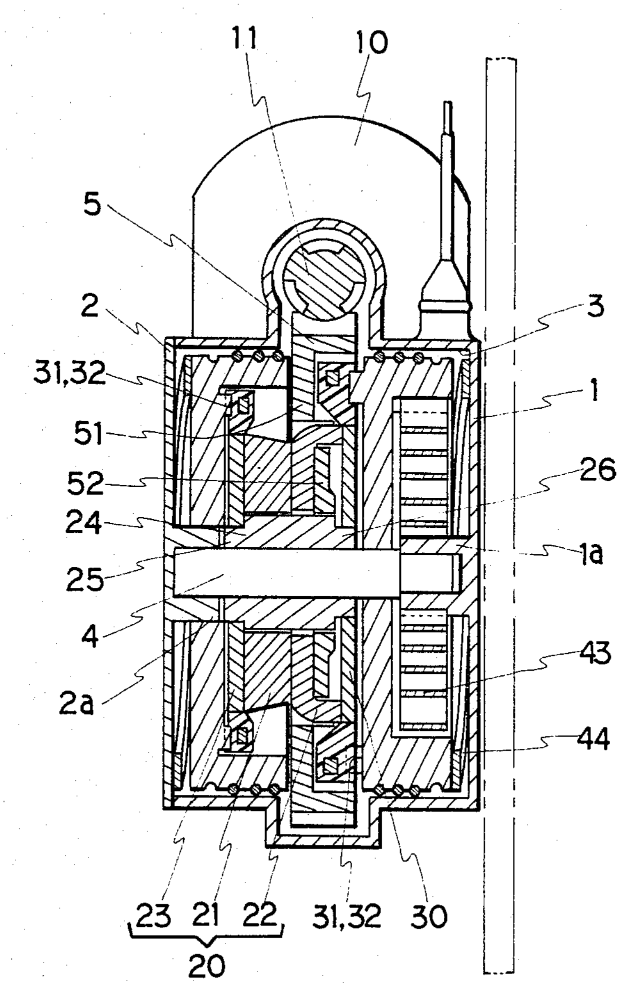
FIG. 5 is a vertical longitudinal sectional view showing another embodiment of a driving device of the invention.
Figure 6:
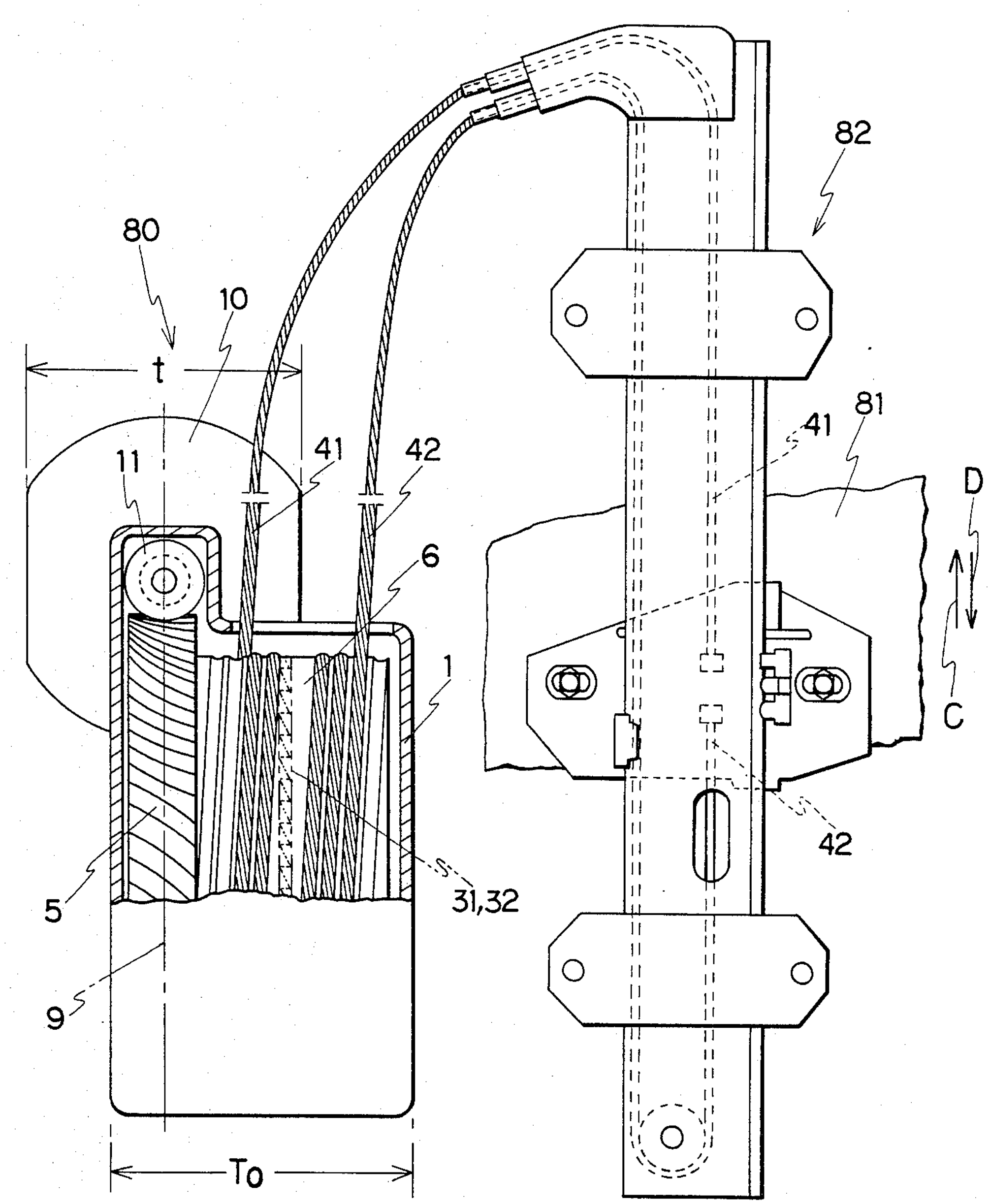
FIG. 6 (PRIOR ART)
FIG. 6 is a partially cutaway front view showing a conventional window regulator as an example.

As another embodiment, ratchet teeth 31, 32 may be provided between a first pulley 6 and a ratchet plate 30. Also, an automatic tension-adjusting mechanism may be constructed so that both a first pulley 6 and a second pulley 7 are driven through respective one-way-clutches (see FIG. 5). In that embodiment, when either wire is wound around their pulleys, an elongation of the wire can be absorbed. Further, when a ratchet plate 30 is constructed with a disc-formed metal plate and a plastic ring having ratchet teeth 31 therearound the ratchet plate 30 can be thinly and stoutly made, and a noise in meshing of ratchet teeth sliding together in opposite direction can be decreased. Such a ratchet plate can be manufactured by arranging a mold having a cavity to form the plastic ring around the metal plate and injectioning molten resin into the cavity.

As referring FIG. 3, both ends of a fixed axis 4 are affixed securely in bosses 1*a*, 2*a* projecting from inner surfaces of the housing 1 and the lid 2. The shaft 24 is rotatably supported on the fixed axis 4. A balance spring 43 having ends which are engaged to a side wall of a concave 7*a* of a second pulley 7 and an outer surface of the boss 1*a* respectively is contained in the concave 7*a* formed with the second pulley 7. When the above balance spring 43 is provided in the second pulley 7, though there is a difference in the actuation force according to the driving directions, e.g. in case that a window glass is slided upper and lower, a load on the motor 10 does not change in accordance with the rotational directions.

Also, the balance spring 43 functions as a means for braking in the same way as the above-mentioned wave washer 44.

In the driving device of the present invention, when a worm 11 and a worm wheel 5 are arranged so that their meshing position locates at higher position than the rotational center of the worm wheel 5, a motor of an electric element can be protected from soakage of rain water, or the like coming along wires 41, 42.

As described above, since a wire-driving device for a window regulator of the present invention is thin in comparison with conventional devices, the practical value is very great. In an example, the inside space of an automobile can be enlarged when the thin driving device is set in door panels of the automobile.

What is claimed is:

1. A wire-driving device for a window regulator comprising:

(a) a housing;

(b) a worm wheel mounted for rotational movement within said housing;

(c) a worm meshing with said worm wheel;

(d) an electric motor for driving said worm, having rotational axis arranged on a center plane of said worm wheel; said center plane being perpendicular to the rotational axis of said worm wheel;

(e) a first pulley arranged concentrically at one side surface of said worm wheel;

(f) a second pulley arranged concentrically at another side surface of said worm wheel;

(g) a first means for transmitting torque from said worm wheel to said first pulley comprising a cylindrical shock absorber having an axial center hall, one end portion connected to said worm wheel and the other end portion connected to said first pulley;

(h) a second means for transmitting torque from said worm wheel to said second pulley comprising said shock absorber in common and a shaft inserted into said axial center hall of said shock absorber; said shaft having end portions connected to said one end portion of said shock absorber and to said second pulley respectively;

(i) a first wire having one end fastened to said first pulley and wound around said first pulley; and (j) a second wire having one end fastened to said second pulley and wound around said second pulley in the opposite direction with respect to said first wire.

2. A wire-driving device for a window regulator as claimed in claim 1 comprising either said first means for transmitting torque to said first pulley or said second means for transmitting torque to said second pulley having one-way-clutch engaging when said pulley is rotated in such direction that said pulley winds up said wire.

3. A wire-driving device for a window regulator as claimed in claim 1 comprising both means for transmitting torque having said one-way-clutch.

4. A wire driving device for a window regulator as claimed in claim 1 comprising a meshing position of said worm and said worm wheel locating at higher position than a rotational center of said worm wheel.

* * * * *